United States Patent
Mochizuki

Patent Number: 6,001,404
Date of Patent: Dec. 14, 1999

[54] METHOD OF MAKING COATED BALL-SHAPED FROZEN DESSERT PRODUCT

[75] Inventor: Keizo Mochizuki, Sakado, Japan

[73] Assignee: Meiji Seika Kaisha Ltd., Tokyo, Japan

[21] Appl. No.: 09/029,676

[22] PCT Filed: Jul. 18, 1997

[86] PCT No.: PCT/JP97/02503

§ 371 Date: Mar. 3, 1998

§ 102(e) Date: Mar. 3, 1998

[87] PCT Pub. No.: WO98/04150

PCT Pub. Date: Feb. 5, 1998

[30] Foreign Application Priority Data

Jul. 26, 1996 [JP] Japan ................................. 8-197506

[51] Int. Cl.$^6$ ............................................. A23G 9/04
[52] U.S. Cl. .............. 426/302; 426/89; 426/93; 426/96; 426/100; 426/101; 426/303; 426/305; 426/309; 426/565; 426/660
[58] Field of Search ................ 426/89, 93, 96, 426/100, 101, 302, 303, 305, 309, 565, 660

[56] References Cited

U.S. PATENT DOCUMENTS

4,971,816  11/1990  Clark et al. .......................... 426/565 X

FOREIGN PATENT DOCUMENTS

| 0217409 | 4/1987 | European Pat. Off. ............... 426/101 |
| 1767537 | 5/1968 | Germany ............................... 426/101 |
| 56-124349 | 9/1981 | Japan . |
| 62-111638 | 5/1987 | Japan .................................... 426/101 |
| 64-30541 | 2/1989 | Japan . |

OTHER PUBLICATIONS

Table of Standard of Component of Milk or Milk Products. Date unknown.
Crowhurst, B., "Manual of Ice Cream", p. 15, 1993.
Dairy Foods, "Long–life Equipment", p. 76, Mar. 1998.

*Primary Examiner*—Milton Cano
*Attorney, Agent, or Firm*—Frishauf, Holtz, Goodman, Langer & Chick, P.C.

[57] ABSTRACT

A method of making a coated ball-shaped frozen dessert product in which an ice cream mix is coated around a center material. The method includes charging an edible center material into a rotary kettle, spraying an ice cream mix which has been adjusted to a temperature of −15° C. to −35° C. into the rotary kettle (the rotary kettle being at a temperature of −35° C. to −15° C.), while concomitantly feeding cooling air at a temperature of −15° C. or below and coating the ice cream mix around the edible center material. In accordance with the method of the present invention, a spherical and spheroidal three-dimensional product can be efficiently produced. The frozen dessert product is free from any undesirable taste and does not contain needle holes or surface damage.

14 Claims, 2 Drawing Sheets

METHOD OF MAKING COATED BALL-SHAPED FROZEN DESSERT PRODUCT

BACKGROUND OF THE INVENTION

1. Field of the Invention

The present invention relates to a method of making a coated ball-shaped frozen dessert product, which comprises coating an ice cream mix of an ice cream, a lact, an ice milk, an edible ice or the like around a center material such as an aqueous or oily edible material, a fresh frozen fruit, a fresh frozen fruit flesh, a fresh frozen vegetable, a dry fruit, a nut or the like.

2. Background Information

As a conventional method of forming a coated frozen dessert product, the following m methods are k known irrespective of the presence or absence of a so-called center material.

First, there is a method of formation using a vitaline device which is a freezing device generally used in the industry of frozen dessert products.

In the method using this vitaline device, for example, first, an ice cream mix (an ice cream mix of an ice cream, a lact ice, an ice milk, an edible ice or the like) which has been sterilized and aged is poured into a metallic container having an optional shape, and the metallic container filled with this ice cream mix is dipped in a brine (calcium chloride aqueous solution) which has been cooled to between −30 and −35° C. to form the mix into an optional shape. Subsequently, a metallic needle (pin) or stick is inserted into the ice cream mix of the metallic container, and the ice cream mix of the metallic container is frozen sufficiently. Then, water at room temperature is put on the outside of t he metallic container to slightly melt the surface of the frozen ice cream mix of the metallic container. In this state, the metallic needle (pin) or stick inserted in advance is lifted up, and the frozen ice cream mix (shaped frozen ice cream mix) shaped in the optional form is taken out of the metallic container. The shaped frozen ice cream taken out of the metallic container is inserted into a chocolate tank or a gum liquid tank to coat the surface of the shaped frozen ice cream. Thereafter, this coated shaped frozen ice cream is dipped into liquid nitrogen to freeze the chocolate or the gum liquid as a coating layer. When the metallic needle (pin) is inserted therein, this metallic needle (pin) is taken out of the frozen dessert product at this time. In this manner, the coated frozen dessert product is obtained.

Next, there is a method not using the above-mentioned vitaline device, namely, a method of formation not using a brine.

The method not using the brine can further be divided into a method using a metallic container and a method not using a metallic container.

In the case of the method using the metallic container, an ice cream mix is poured into the metallic container. Subsequently, a metallic needle (pin) or stick is thrust into the ice cream mix of the metallic container, and the mix is frozen in cooling air of from −30 to −40° C. in this state. When it is completely frozen, the metallic needle (pin) or stick previously thrust into the ice cream mix of the metallic container is lifted up to take the product off. Then, chocolate or the like is coated thereon to form a coated frozen dessert product.

Meanwhile, in the case of the method not using the metallic container, an aerated ice cream mix leaving a freezer is discharged from a nozzle of an optional shape, and cut using a cutter knife. Chocolate or the like is coated on the surface of the thus-shaped ice cream mix to form a coated frozen dessert product.

However, the methods of forming the frozen dessert product by the above-mentioned conventional techniques involve the following drawbacks.

First, in the method using the vitaline device, namely, in the method using the brine, a daily control is required in order not to put the calcium chloride aqueous solution as the brine on the surface of the frozen dessert product. The reason is that if even a small amount of the brine is put on the frozen dessert product, a frozen dessert product having a bitter taste (foreign taste) peculiar to the brine is provided, and it becomes an unacceptable frozen dessert product. Further, in the case of using the metallic needle (pin), instead of the stick, a device for thrusting the pin into the ice cream mix of the metallic container and a pin sterilizer are needed, increasing the cost of equipment. Further, in this case, a pin hole is left in the surface of the frozen dessert product, and the frozen dessert product has such a damage thereon.

On the other hand, even in the method in which the ice cream mix is shaped by freezing the metallic container filled with the ice cream mix in cooling air without using the brine but upon using the pin, a device for thrusting the pin into the ice cream mix of the metallic container and a pin sterilizer are likewise needed, increasing the cost of equipment. Further, in this case, a pin hole is left in the surface of the frozen dessert product, and the frozen dessert product has such a damage thereon.

Still further, in the case of using neither the brine nor the metallic container, a step of aeration of the ice cream mix, an extrusion-shaping step and a cutting step are needed, involving problems that a method of making the product is complicated and the cost of equipment is increased.

It is an object of the present invention to provide a method of making a coated ball-shaped frozen dessert product which is free from occurrence of a foreign taste owing to a calcium chloride aqueous solution scattering and being adhered to a product by the use of a brine that can occur in the production using the vitaline device.

Another object of the present invention is to provide a method of making a coated ball-shaped frozen dessert product which is free from problems that a pin hole is left in the product and the cost of equipment is increased.

Still another object of the present invention is to provide a method of making a coated frozen dessert product having a ball-shape, namely, a spherical or spheroidal three-dimensional product, which is uniform and has no damaged surface.

SUMMARY OF THE INVENTION

The present inventors have assiduously conducted investigations to solve the above-mentioned problems in making the coated frozen dessert products, and have consequently completed the present invention.

That is, the present invention is to provide a method of making a coated ball-shaped frozen dessert product in which an ice cream mix is coated around a center material, the method which comprises coating the center material with an ice cream mix which has been adjusted to a temperature of a maximum of −15° C. and a minimum of −35° C. through granulation using a rotary kettle while feeding cooling air at a maximum temperature of −15° C.

BRIEF DESCRIPTION OF THE DRAWINGS

In FIGS. 1, 2A and 2B, numeral 1 is a freezer, numeral 2 an ice cream mix pressure-feeding tank, numeral 3 a compressed air generating device, numeral 4 a spray nozzle, numeral 5 a cooling air generating device, numeral 6 a cooling air generating device, numeral 7 a rotary kettle, numeral 8 a compressed air cooling device, numeral 9 a liquid nitrogen feeding device, numeral 10 a liquid nitrogen receiving storage tank, numeral 11 a cap portion, numeral 12 a cooling compressed air inlet, numeral 13 an ice cream mix inlet, numeral 14 a body, numeral 15 a trough, numeral 16 an ice cream mix receptacle, and numeral 17 a compressed air introduction pipe respectively.

DETAILED DESCRIPTION OF THE INVENTION

The characteristics of the present invention are described in detail below.

The present invention is characterized in that a center material is coated with an ice cream mix which has been adjusted to a maximum temperature of −15° C. and a minimum temperature of −35° C. through granulation using a rotary kettle while feeding cooling air at a maximum temperature of −15° C.

Figure 1:
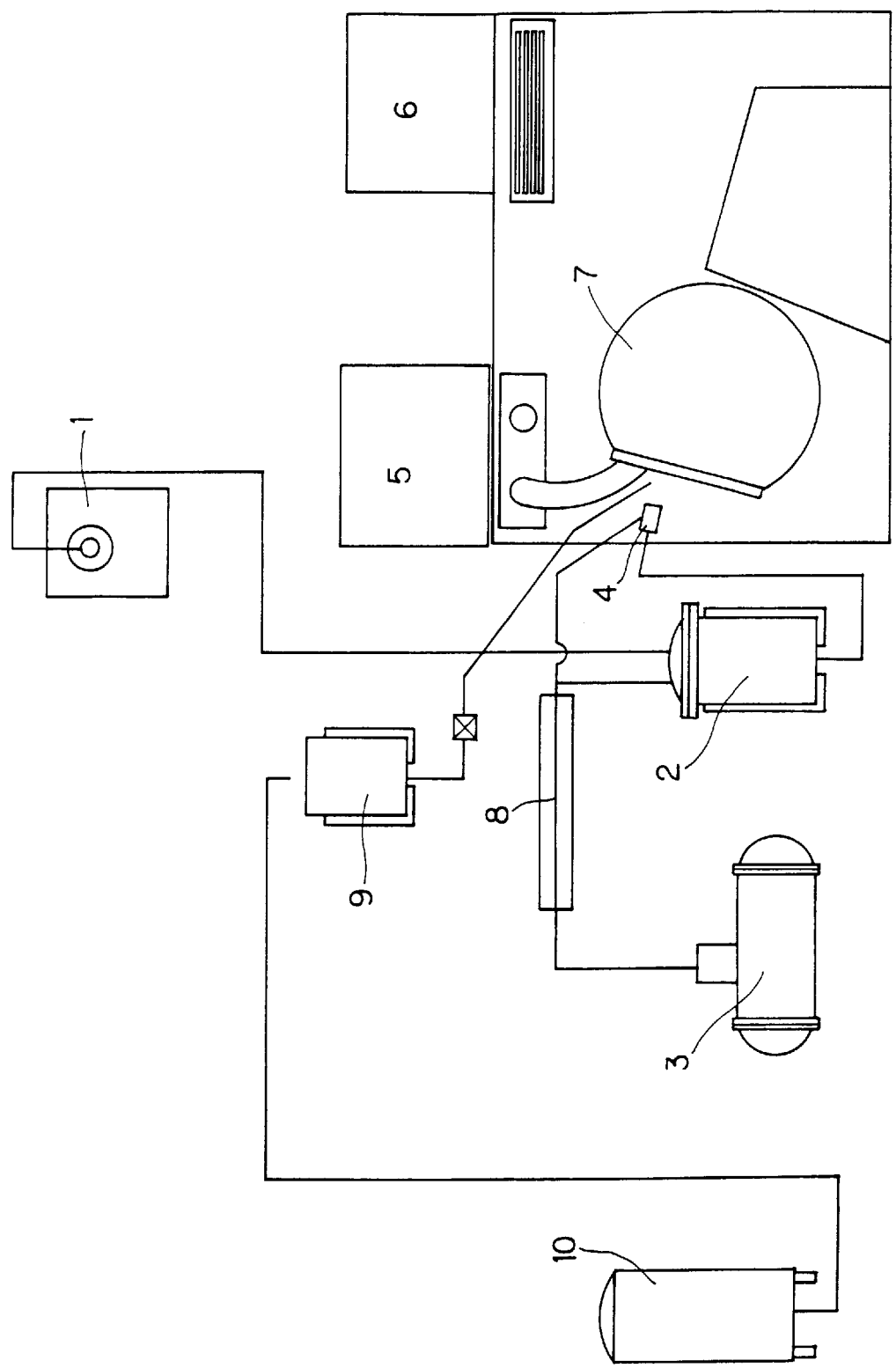
FIG. 1 is a schematic diagram of equipment for making a coated frozen dessert product which can preferably be used to practice a method of making a coated ball-shaped frozen dessert product of the present invention.

The present invention having such a construction can preferably be conducted using equipment for making a coated frozen dessert product as shown in FIG. 1.

The method of the present invention is illustrated by referring to the drawings. FIG. 1 shows an example of equipment for making a coated frozen dessert product using a rotary kettle. The method of the present invention can efficiently be practiced by using the rotary kettle shown in FIG. 1.

The equipment for making the coated frozen dessert product as shown in FIG. 1 comprises a freezer 1, an ice cream mix pressure-feeding tank 2, a compressed air generating device 3, a compressed air cooling device 8, a rotary kettle 7, a spray nozzle 4, cooling air generating devices 5 and 6, a liquid nitrogen feeding device 9 and a liquid nitrogen receiving storage tank 10.

An ice cream mix which has subjected to a usual step of making an ice cream is frozen by the freezer 1 to form ice crystals, and the ice crystals are then fed to the ice cream mix pressure-feeding tank 2.

This ice cream mix pressure-feeding tank 2 is used when good spray conditions do not exist at the extrusion pressure of the freezer 1.

Accordingly, when an ice cream mix can normally be sprayed only at the extrusion pressure of the freezer 1, it is possible to directly connect the freezer 1 with the spray nozzle 4.

In FIG. 1, the ice cream mix pressure-feeding tank 2 is used. Cooling compressed air is generated with the compressed air generating device 3 and the compressed air cooling device 8, and this is used to increase the pressure within the ice cream mix pressure-feeding tank 2 and to spray the ice cream mix with the spray nozzle 4.

The rotary kettle 7 is accommodated in a closed container, and the inside of the container is set at a predetermined temperature with the cooling air generating device 6.

Further, predetermined cooling air can be fed to the inside of the rotary kettle 7 with the cooling air generating device 5.

The ice cream mix is fed into this rotary kettle 7, granulated, and then coated around the center material.

Figure 2A:
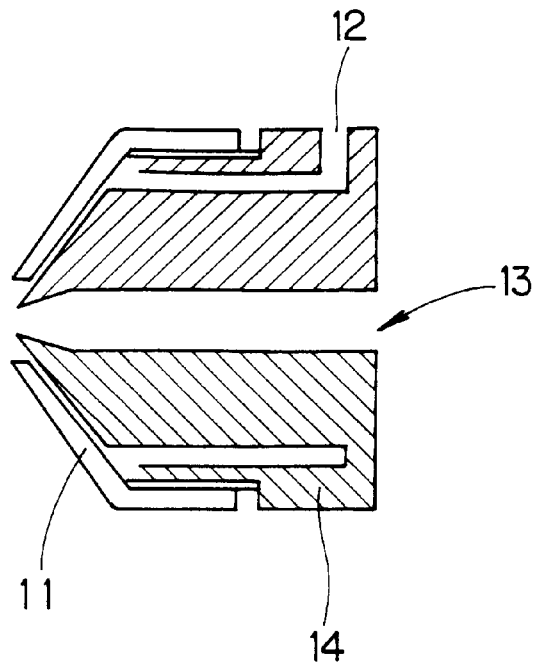
FIG. 2A is a sectional view of a spray nozzle 4 in the equipment for making the coated frozen dessert product shown in FIG. 1.
Figure 2B:
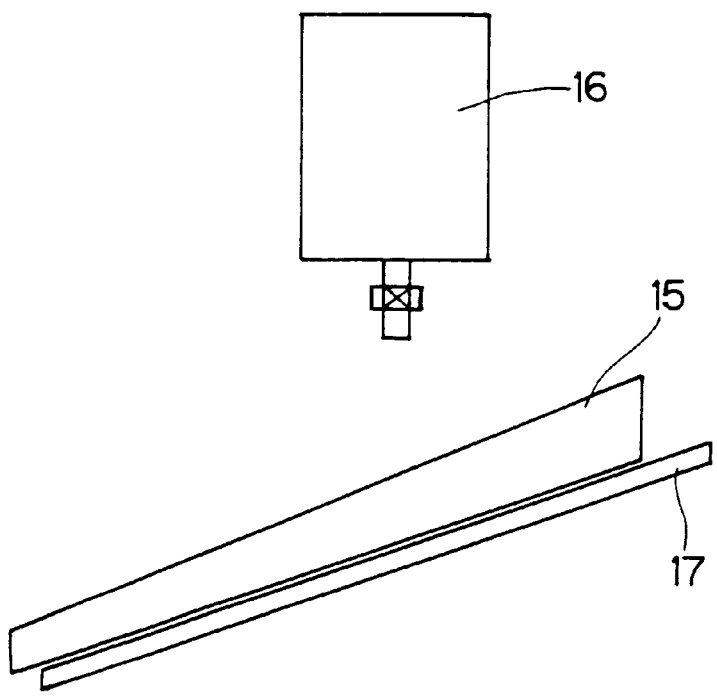
FIG. 2B is an elevational view of a spray nozzle 4 as shown in FIG. 1.

For example, the spray nozzle shown in FIG. 2A or FIG. 2B is preferably used to feed the ice cream mix into the rotary kettle 7 because the ice cream mix can uniformly be coated around the center material. However, this is not critical. It is also possible to simply spread the ice cream mix around the center material.

FIGS. 2A and 2B are drawings showing the sectional shape of the spray nozzle 4 in the equipment for making the coated frozen dessert product as shown in FIG. 1. Two types of the spray nozzle are shown therein.

The spray nozzle in FIG. 2A comprises the body 14 having an ice cream mix introduction passage and a compressed air introduction passage, and the cap portion 11 for controlling the state of uniformly spraying the ice cream mix. In FIG. 2A, numeral 12 is a cooling compressed air inlet, and the compressed air introduced from this inlet 12 to the nozzle is passed through a gap between the cap portion 11 and the body 14 and discharged from the tip of the nozzle. Numeral 13 is the ice cream mix inlet. An amount of air discharged is controlled depending on a degree of opening of the cap portion 11 to thereby control the spray condition of the ice cream mix.

Meanwhile, the spray nozzle in FIG. 2B comprises the compressed air introduction pipe 17, the trough 15 and the ice cream mix receptacle 16. The ice cream mix received in the ice cream mix receptacle 16 is dropped on the trough 15 by opening a valve mounted on the lower portion of the ice cream mix receptacle 16. The ice cream mix dropped on the trough 15 flows through the inclined trough 15 and reaches the tip of the nozzle. The ice cream mix discharged is sprayed with the compressed air introduced into the compressed air introduction pipe 17.

The method of the present invention is preferably conducted using the equipment for making the coated frozen dessert product as shown in FIGS. 1, 2A and 2B.

As mentioned above, the present invention is characterized in that the ice cream mix which has been adjusted to a temperature of a maximum of −15° C. and a minimum of −35° C. is coated around the center material through granulation using the rotary kettle, while feeding cooling air at a maximum temperature of −15° C.

The center material used in the method of the present invention includes an aqueous or oily edible product, a fresh frozen fruit, a fresh frozen fruit flesh, a fresh frozen vegetable, a dry fruit, a nut and the like.

It is possible that the oily edible product such as a chocolate, a white chocolate cream, a fresh cream or the like is shaped using a shaping roll which has been cooled, and this shaped product is used as a center material. Further, it is also possible that this product is solidified through cooling, and then cut to an appropriate size, and this cut product is used as a center material.

As a nut, an almond, a cashew nut, a peanut, a hazel nut or the like which is ordinarily used in a confectionery can be employed as it is for the center material. Further, it is also possible that the cut product thereof is mixed with the edible oily cream such as a chocolate, a white chocolate cream, a fresh cream or the like, and the mixture thereof is shaped by the above-mentioned shaping method, and the resulting product is used as the center material.

Likewise, as the center material, the dry fruit, the fresh frozen fruit, the fresh frozen fruit flesh, the fresh frozen vegetable or the like can be used as it is. It is also possible that the cut product thereof is further mixed with an edible oily cream such as a chocolate, a white chocolate cream, a fresh cream or the like, the mixture is shaped by the above-mentioned shaping method, and the resulting product is used as the center material.

The thus-obtained center material is coated with the ice cream mix. The present invention is characterized in the coating manner.

The ice cream mix for coating used in the present invention includes ice cream mixes of an ice cream, an ice milk, a lact ice, an edible ice or the like.

This ice cream mix can be obtained, for example, in the following manner.

The ice cream mix is, like the usual ice cream mix, obtained by mixing a milk product, a saccharide, an emulsifying agent, a stabilizer, a flavor, a fat, a seasoning raw material, water and the like, homogenizing the mixture, sterilizing the product, cooling the sterilized product to between 2 and 4° C., and charging the cooled product into an ageing tank where the mixture is subject to ageing in a usual manner. Further, the aged ice cream mix is frozen to obtain a frozen ice cream mix.

In the present invention, such a frozen ice cream mix which has been adjusted to a temperature at a maximum of −15° C. and at a minimum of −35° C. is coated around the center material though granulation using the rotary kettle while feeding the cooling air at a maximum temperature of −15° C.

Usually, the center material is charged into the rotary kettle 7 (rotary kettle which has been cooled to a maximum temperature of −15° C. and at a minimum temperature of −35° C.) as shown in FIG. 1, and rotated. In this rotating state, the ice cream mix is supplied to the center to coat this center material. That is, the ice cream mix is coated around the center material through granulation using the rotary kettle 7 adjusted to the specific temperature.

The coating of the frozen ice cream mix around the center material is conducted, for example, by spraying the mix using compressed air having the adjusted temperature for maintaining fine ice crystals of the frozen ice cream mix. More specifically, this coating may be conducted using a two-fluid-type spray nozzle employing the compressed air as shown in FIG. 2A or FIG. 2B. Ordinarily, the frozen ice cream mix is coated around the center material using the compressed air. However, this is not critical.

When the frozen ice cream mix is coated on the surface of the center material in the rotary kettle 7, cooling air at a maximum temperature of −15° C. is fed into the rotary kettle to freeze the ice cream mix around the surface of the center material.

This procedure (procedure of coating the ice cream mix around the center material, and feeding the cooling air thereto to freeze the ice cream mix) is repeated to obtain a coated frozen dessert product in which the ice cream mix of an ice cream, an ice milk, a lact ice, an edible ice or the like is coated around the surface of the center material, in other words, the coated frozen dessert product is formed three-dimensionally like a ball.

These production steps can proceed efficiently using the rotary kettle. In this case, the rotary kettle has to be cooled to a maximum temperature of −15° C. in advance.

When the temperature of the rotary kettle is higher than −15° C., the ice cream mix coated around the center material is melted, and the coating cannot be conducted. Meanwhile, when the rotary kettle is adjusted to a temperature of lower than −35° C., the ice cream mix coated around the center material sticks to the inner wall of the rotary kettle, undesirably decreasing the efficiency of coating the same around the center material. Consequently, the temperature of the rotary kettle has to be set at a maximum temperature of −15° C. and a minimum temperature of −35° C.

Further, the temperature of compressed air used in spraying the frozen ice cream mix onto the center material using the compressed air is preferably between −30° C. and 10° C. In order to keep fine ice crystals of the ice cream mix, it is more preferable to use compressed air which is adjusted to a temperature of from −5° C. to 0° C.

On the other hand, in order to freeze the ice cream mix coated around the surface of the center material, it is necessary to feed cooling air at a maximum temperature of −15° C. When the temperature of cooling air is higher than −15° C., it is impossible to freeze hard the ice cream mix of an ice cream, an ice milk, a lact ice, an edible ice or the like having the ordinary solid content and having been coated on the surface of the center material. Thus, the coating becomes impossible. Meanwhile, when the temperature of cooling air which is lower than −15° C., the lower temperature gives better coating conditions of the ice cream mix so far as economics is permitted.

Further, the optimum cooling air temperature, rotary kettle temperature and product temperature vary depending on the solid content of the ice cream mix irrespective of the type of the ice cream mix.

Table 1 shows the relationship thereof.

TABLE 1

The solid content of the ice cream mix and the optimum temperature conditions

| Solid content of the ice cream (weight %) | Temperature of the rotary kettle (° C.) | Temperature of the product (° C.) | Temperature of cooling air (° C.) | Coated state |
| --- | --- | --- | --- | --- |
| 37 | −25 | −20 | −35 | good |
|  | −20 | −15 | −25 | bad |
| 32 | −20 | −15 | −25 | good |
|  | −15 | −10 | −25 | bad |
| 25 | −15 | −10 | −25 | good |
|  | −15 | −6 | −15 | bad |
| 12 | −15 | −6 | −15 | good |
|  | −10 | −4 | −15 | bad |

In Table 1, the solid content of the ice cream (weight %) means a value which is given by dividing the weight of the residue obtained through evaporation of the ice cream to dryness by the weight of the ice cream before evaporation to dryness is expressed by weight %. Next, the temperature of the rotary kettle refers to a temperature of a space portion of a rotary kettle used in the confectionery industry. Further, the temperature of the product refers to a temperature of a product being rotated within the rotary kettle. Still further, the temperature of cooling air refers to a temperature of cooling air to be fed into the rotary kettle.

The coated state refers to evaluation as to whether the ice cream mix can normally be granulated without adhesion and solidification of particles.

As shown in Table 1, it is clear that the preferable rotary kettle temperature, product temperature and cooling air temperature are set depending on the solid content (weight %) of the ice cream.

For example, in order to coat around a center material with an ice cream mix having a high solid content of 37%, a preferable coated state can be provided by setting the rotary kettle inner temperature at lower than −20 C., approximately −25 C., the product temperature at lower than −15° C., approximately −20 C. and the temperature of cooling air to be fed at lower than −25 C., approximately −35 C. respectively.

When the ice creams having the same solid content of 37% by weight and the high solid content are coated around the center material, no preferable coating can be conducted under such three conditions that the rotary kettle temperature is −20 C. or higher, the product temperature is −15° C. or higher and the temperature of cooling air to be fed is −25° C. or higher.

Under the optimum conditions of the ice cream coating temperatures, the ice cream mix of an ice cream, an ice milk, a lact ice, an edible ice or the like is coated around the center material. The amount of the ice cream mix to be coated has to be in an amount suited for uniformly coating the surface of the center material therewith and continuously freezing the coated ice cream mix.

To this end, there can be employed a method in which the ice cream mix is coated around the center material in such an amount as to be able to coat the whole surface of the center material, the ice cream mix is then confirmed to be spread uniformly on the surface of the center material, and the thus-coated ice cream is frozen by feeding cooling air thereto and granulated, and a method in which cooling air is fed continuously or intermittently while a small, appropriate amount of an ice cream mix is continuously coated around the center material to freeze the ice cream mix, and the ice cream mix is coated around the center material and granulated.

According to the method of the present invention, the ice cream mixes can be coated around the center material either singly or in combination in layers.

When two or more ice cream mixes are coated around the center material in the method of the present invention, the above-mentioned coating step is conducted on each dough. Specifically, one of two or more ice cream mixes are subjected to the above-mentioned coating step. After the ice cream mix is uniformly coated and completely frozen, the coating step is consequently repeated as to the remaining ice cream mixes respectively.

With respect to the frozen dessert product obtained by coating around the center material with the ice cream mix according to the method of the present invention, the surface thereof is, as required, coated with a liquid chocolate, or further with a flaky chocolate, a cocoa powder, a nut or the like to be able to obtain another frozen dessert product.

Specifically, a liquid chocolate is coated on the surface of the coated frozen dessert product obtained by the method of the present invention, or at least one of a flaky chocolate, a cocoa powder and a nut can further be coated thereon.

The above-mentioned liquid chocolate or the like may be coated with the rotary kettle used in making the frozen dessert product or other means, for example, a drum coater or the like. Thus, a device therefor is not particularly limited.

Further, a combination of a plurality of chocolates to be coated can be used. Examples of the combination include a combination of liquid chocolates only, a combination of a liquid chocolate and a flaky chocolate, a combination of a liquid chocolate and a cocoa powder, and a combination of a liquid chocolate and a nut, and the like. However, the combination is not particularly limited thereto. These combinations can provide chocolate-coated ball-shaped ice cream products having different tastes and different feels upon eating.

The method of the present invention can provide a coated frozen dessert product which is a ball-shaped, namely spherical or spheroidal, three-dimensional product, which is free from occurrence of a foreign taste owing to a calcium chloride aqueous solution scattering and being adhered to a product given by using a brine that can occur when conducting the production using a vitaline device, and which does not have any needle holes for taking a product off in making a stickless product with a vitaline and is uniform without damage on the surface.

The method of making the frozen dessert product in the present invention is illustrated by referring to the following Examples.

However, the present invention is not limited to Examples mentioned below, and coated ball-shaped frozen dessert products having various tastes and various feels upon eating can be produced by a combination of a center material, a coating ice cream mix and a coating chocolate.

EXAMPLE 1

A fresh cream (120 parts by weight), 65 parts by weight of a sugar, 15 parts by weight of a candy powder, 50 parts by weight of a whole milk powder, 2.5 parts by weight of an emulsifying agent, 2.5 parts by weight of gelatin, 0.5 parts by weight of a flavor and 260 parts by weight of water were mixed and dissolved, treated with a homogenizer in a usual manner, sterilized and subject to ageing to form an ice cream mix. This mix was further frozen. In this manner, a frozen ice cream mix of an ice cream having an overrun of 120, a temperature of −2° C. and a solid content of 37% by weight was obtained.

On the other hand, a center material dough comprising 20 parts by weight of an almond nut cream, 25 parts by weight of a vegetable hardened fat, 30 parts by weight of a sugar, 20 parts by weight of a skim milk powder, 0.5 parts by weight of an emulsifying agent and 0.2 parts by weight of a flavor was rolled to form a cream. This center material mix was shaped at a ratio of 2 g/granule using a shaping roll which had been cooled to −20° C. to give a shaped edible oily center material.

As shown in FIG. 1, the rotary kettle 7 fitted with the cooling air generating device was charged with the above-mentioned shaped edible oily center material under the condition of the kettle having been cooled to −25° C. in advance, and the rotation started at 20 rpm.

In this state, the above-mentioned frozen ice cream mix having an overrun of 120 and a temperature of −2° C. was coated around the shaped edible oily center material in the rotary kettle 7 at a compressed air temperature of −3° C. using a spray nozzle shown in FIG. 2A. At the same time, cooling air at −35° C. was fed to solidify and harden the coated ice cream mix, whereby the ice cream mix could be coated around the edible oily center material. Thus, 100 parts by weight of the shaped edible oily center material were coated with 400 parts by weight of the ice cream mix to obtain a ball-shaped frozen dessert product in which the ice cream was coated around the shaped edible oily center material.

EXAMPLE 2

An ice cream mix was produced in the same manner as in Example 1 except that 77 parts by weight of a milk, 3.4 parts by weight of a fresh cream, 4.3 parts by weight of a skim milk powder, 15 parts by weight of a sugar, 0.5 parts by weight of a stabilizer and 0.3 parts by weight of a flavor were used as ice cream mix starting materials. In this manner, a frozen ice cream mix of an ice milk having a solid content of 30% by weight, an overrun of 50 and a temperature of −2° C. was obtained.

This frozen ice cream mix was coated using a spray nozzle as in Example 1 around a fresh frozen strawberry which had been charged into the rotary kettle 7, whereby quite a new ice ball could be produced in which the strawberry center material was coated with the frozen ice cream mix of the ice milk.

Soon after a liquid chocolate was charged into a drum coater filled with this coated frozen dessert product, a cocoa powder was applied thereto to obtain a product in which the surface of the ice milk of the coated frozen dessert product was further coated with the chocolate and the cocoa.

EXAMPLE 3

An ice cream mix was produced in the same manner as in Example 1 except that 43.7 parts by weight of milk, 10.1 parts by weight of a fresh cream, 28 parts by weight of a condensed whole milk, 2.7 parts by weight of a raw egg, 15 parts by weight of a sugar, 0.5 parts by weight of a stabilizer and 0.2 parts by weight of a flavor were used as ice cream mix starting materials. In this manner, an egg-containing frozen ice cream mix of an ice milk having a solid content of 31% by weight, overrun of 60 and a temperature of −2° C. was obtained.

On the other hand, an ice cream mix was produced in the same manner as in Example 1 except that 50 parts by weight of an orange juice, 8 parts by weight of a sugar, 2 parts by weight of glucose, 0.5 parts by weight of a stabilizer, 50 parts by weight of water and 0.2 parts by weight of a flavor were used as ice cream mix starting materials. In this manner, a frozen ice cream mix of an ice having a solid content of 15% by weight, an overrun of 40 and a temperature of −2° C. was obtained.

Subsequently, 40 parts by weight of a white chocolate spherical center material was charged into the rotary kettle 7 (rotational frequency 20 rpm) which had been cooled to −25° C. The above-mentioned frozen ice cream mix of an edible ice having an overrun of 40 was coated around the white chocolate spherical center material of the rotary kettle 7 at a compressed air temperature of −3° C. using a spray nozzle shown in FIG. 2B, and frozen by feeding cooling air of −25° C. The surface of the white chocolate spherical center material was coated with 40 parts by weight of the above-mentioned frozen ice cream mix of the edible ice having an overrun of 40 to obtain a product in which the surface of the white chocolate spherical center material was coated with the frozen ice cream mix of the edible ice having an overrun of 40.

Subsequently, the surface of 80 parts by weight of the coated product was coated with 80 parts by weight of the above-mentioned egg-containing frozen ice cream mix of an ice milk having an overrun of 60 to obtain a ball-shaped coated frozen dessert product.

In this manner, quite a new product was obtained in which the edible ice (frozen ice cream mix of the edible ice) and the egg-containing ice cream (egg-containing frozen ice cream mix of the ice milk type) were coated around the white chocolate center material (white chocolate spherical center material).

EXAMPLE 4

An ice cream mix was produced in the same manner as in Example 1 except that 50 parts by weight of an orange juice, 8 parts by weight of a sugar, 2 parts by weight of glucose, 0.5 parts by weight of a stabilizer and 50 parts by weight of water were used as ice cream mix starting materials. In this manner, a frozen ice cream mix having a solid content of 15% by weight was obtained.

A frozen strawberry as a center material was charged into the rotary kettle 7 (rotational frequency 20 RPM) which had been adjusted to a temperature of −15° C. While cold air at −15° C. was fed to the rotary kettle, the above-mentioned frozen ice cream mix of an edible ice was cooled to 2° C., and sprayed at a compressed air temperature of −3° C. using the spray nozzle shown in FIG. 2A such that the temperature of the center material reached −6° C. or lower to obtain a ball-shaped coated frozen product in which 60 parts by weight of the frozen ice cream mix of the edible ice were coated around 40 parts by weight of the center material.

In this manner, a new product was obtained in which the frozen ice cream mix of the edible ice was coated around the frozen strawberry as a center material.

EXAMPLE 5

An ice cream mix was produced as in Example 1 except that 5 parts by weight of an orange juice, 8 parts by weight of a sugar, 2 parts by weight of glucose, 0.5 parts by weight of a stabilizer, 13 parts by weight of a sweetened condensed skim milk, 6.5 parts by weight of a vegetable fat, 3 parts by weight of a starch syrup and 60 parts by weight of water were used as ice cream mix starting materials. In this manner, a frozen ice cream mix of a lact ice having a solid content of 31% by weight was obtained.

The rotary kettle 7 was adjusted to −20° C. in advance, and a frozen cherry as a center material was charged into the rotary kettle 7. While cold air of −25° C. was fed to the rotary kettle, the above-mentioned frozen ice cream mix of the lact ice was cooled to 2° C., and sprayed at a compressed air temperature of −3° C. using the spray nozzle shown in FIG. 2A such that the temperature of the center material reached −20 C. In this manner, a ball-shaped coated frozen dessert product was obtained in which 60 parts by weight of the frozen ice cream mix of the lact ice were coated around 40 parts by weight of the center material.

Thus, the product was obtained in which the frozen ice cream mix of the lact ice was coated around the frozen cherry as a center material.

In accordance with the above-mentioned method of the present invention, a ball-shaped coated frozen dessert product can be produced which is free from occurrence of a foreign taste owing to the calcium chloride aqueous solution scattering and being adhered to a product by the use of a brine which can occur when an frozen dessert product is produced with a vitaline device.

Next, in accordance with the method of the present invention, the ball-shaped coated frozen dessert product can be produced which is free from such problems that a pin hole is left on the product and the cost of equipment is increased.

Further, in accordance with the method of the present invention, the coated frozen dessert product can be produced which is a ball-shaped, namely spherical or spheroidal three-dimensional product, and which is uniform without the damage on the surface.

That is, in accordance with the method of the present invention, a three-dimensional product can efficiently be produced which has a spherical or spheroidal shape, which is free from occurrence of a foreign taste owing to a brine (calcium chloride aqueous solution) scattering and being adhered to a product, that were problems that caused complaints in the industry of frozen desserts. The frozen dessert product made according to the present invention has no needle holes for taking product off in making a stickless product with a vitaline device and is uniform without damage on the surface thereof.

In accordance with the method of the present invention, a wide variety of aqueous and oily edible products, a fresh frozen fruit, a fresh frozen fruit flesh, a fresh frozen particulate vegetable, a dry fruit and the like can all be used as a center material.

Further, in the method of the present invention, the frozen ice cream mix can singly be coated, or two or more ice cream mixes are selected as required and can be coated in layers, realizing the production of quite a new frozen dessert product.

Still further, it is also possible to make an frozen dessert product in which the surface of the coated frozen dessert product obtained by the method of the present invention is further coated with a liquid chocolate, a flaky chocolate, a cocoa powder, a nut or the like. Thus, new coated frozen dessert products having various tastes and feels upon eating can be provided by the combination of the center material, the coating ice cream mix and the coating chocolate.

Industrial Applicability

The present invention can effectively be utilized in making frozen dessert products.

I claim:

1. A method of making a coated ball-shaped frozen dessert product comprising:
   (a) charging an edible center material into a rotary kettle:
   (b) spraying an ice cream mix which has been adjusted to a temperature of −15° C. to −35° C. into the rotary kettle the rotary kettle being at a temperature which is controlled between −35° C. to −15° C. while concomitantly feeding cooling air at a temperature of −15° C. or below, and
   (c) coating the ice cream mix from step (b) around the edible center material.

2. The method of making the coated ball-shaped frozen dessert product as claimed in claim 1, wherein the ice cream mix is coated around the edible center material by spraying using compressed air at a temperature to maintain fine ice crystals thereof.

3. The method of making the coated ball-shaped frozen dessert product as claimed in claim 1, wherein the ice cream mix is coated around one edible center material either singly or in a combination of layers.

4. The method of making the coated ball-shaped frozen dessert product as claimed in claim 1, which further comprises coating the ice cream mix around the edible center material, and then coating the surface of the resultant product with a liquid chocolate or optionally further coating the resultant chocolate-coated surface with one or more edible materials selected from the group consisting of a flaky chocolate, a cocoa powder and a nut.

5. The method of making the coated ball-shaped frozen dessert product as claimed in claim 2, wherein the ice cream mix is coated around one edible center material either singly or in a combination of layers.

6. The method of making the coated ball-shaped frozen dessert product as claimed in claim 2, which further comprises coating the ice cream mix around the edible center material, and then coating the surface of the resultant product with a liquid chocolate or optionally further coating the resultant chocolate-coated surface with one or more edible materials selected from the group consisting of a flaky chocolate, a cocoa powder and a nut.

7. The method of making the coated ball-shaped frozen dessert product as claimed in claim 3, which further comprises coating the ice cream mix around the edible center material, and then coating the surface of the resultant product with a liquid chocolate or optionally further coating the resultant chocolate-coated surface with one or more edible materials selected from the group consisting of a flaky chocolate, a cocoa powder and a nut.

8. The method of making the coated ball-shaped frozen dessert product as claimed in claim 5, which further comprises coating the ice cream mix around the edible center material, and then coating the surface of the resultant product with a liquid chocolate or optionally further coating the resultant chocolate-coated surface with one or more edible materials selected from the group consisting of a flaky chocolate, a cocoa powder and a nut.

9. The method of making the coated ball-shaped frozen dessert product as claimed in claim 2, wherein the ice cream mix comprises a milk product selected from the group consisting of ice cream, ice milk, lact ice and edible ice.

10. The method of making the coated ball-shaped frozen dessert product as claimed in claim 9, wherein the edible center material is selected from the group consisting of a chocolate cream, a fresh cream, a fresh frozen fruit, a fresh frozen vegetable, a dried fruit and a nut.

11. The method of making the coated ball-shaped frozen dessert product as claimed in claim 10, wherein the ice cream mix is obtained by mixing a milk product, a saccharide, an emulsifying agent, a stabilizer, a flavor, a fat, a seasoning and water, homogenizing the resultant mixture, sterilizing the resultant product, cooling the resultant sterilized product to a temperature of 2 to 4° C., and introducing the resultant cooled product into an ageing tank.

12. The method of making the coated ball-shaped frozen dessert product as claimed in claim 11, wherein the ice cream mix has a solid content of 12 to 37 weight %; the rotary kettle is at a temperature of −15° C. to −25 C.; and the cooling air is at a temperature of −15° C. to −35° C.

13. The method of making the coated ball-shaped frozen dessert product as claimed in claim 11, wherein the compressed air is at a temperature of −30° C. to 10° C.

14. The method of making the coated ball-shaped frozen dessert product as claimed in claim 13, wherein the compressed air is at a temperature of −50° C. to 0° C.

* * * * *